United States Patent [19]

Jung et al.

[11] Patent Number: 4,723,358
[45] Date of Patent: Feb. 9, 1988

[54] APPARATUS FOR INSERTING RODS CONTAINING NUCLEAR FUEL OR NEUTRON ABSORBER MATERIAL IN A PREDETERMINED DENSE PACKING IN A VESSEL

[75] Inventors: Wilfried Jung; Heinz Knaab, both of Erlangen, Fed. Rep. of Germany

[73] Assignee: Kraftwerk Union Aktiengesellschaft, Mülheim/Ruhr, Fed. Rep. of Germany

[21] Appl. No.: 832,033

[22] Filed: Feb. 21, 1986

[30] Foreign Application Priority Data

Feb. 25, 1985 [DE] Fed. Rep. of Germany ....... 3506584

[51] Int. Cl.⁴ .................. G21C 19/32; G21C 19/06
[52] U.S. Cl. .................. 29/723; 29/426.3; 376/261; 376/272
[58] Field of Search ............ 376/272, 261, 285; 250/506.1, 507.1; 414/146; 29/723, 400 N, 426.2, 426.3

[56] References Cited

U.S. PATENT DOCUMENTS

| | | | |
|---|---|---|---|
| 3,807,018 | 4/1974 | Ehrman et al. | 29/723 |
| 4,124,445 | 11/1978 | Mollon | 376/272 |
| 4,139,778 | 2/1979 | Raymond | 376/272 |
| 4,192,716 | 3/1980 | Anthony | 376/364 |
| 4,278,501 | 7/1981 | Steinke | 376/285 |
| 4,441,242 | 4/1984 | Hicken et al. | 376/272 |
| 4,474,727 | 10/1984 | Kmonk et al. | 376/272 |
| 4,547,117 | 10/1985 | Shields | 376/272 |
| 4,636,351 | 1/1987 | Rohr | 376/272 |
| 4,650,641 | 3/1987 | Formanek | 376/272 |

FOREIGN PATENT DOCUMENTS

| | | | |
|---|---|---|---|
| 0066695 | 12/1982 | European Pat. Off. | 376/261 |
| 0128236 | 12/1984 | European Pat. Off. | 376/261 |
| 0004454 | 12/1983 | PCT Int'l Appl. | 376/261 |

Primary Examiner—Deborah L. Kyle
Assistant Examiner—Daniel Wasil
Attorney, Agent, or Firm—Herbert L. Lerner; Laurence A. Greenberg

[57] ABSTRACT

An apparatus for inserting rods of a rod bundle from a nuclear reactor fuel assembly into a vessel includes a dense-setting device including: a holding cage for laterally holding the rods together in a given dense packing with mutually parallel longitudinal axes, the cage having a bottom on which one end of each of the rods stand; an insert associated with the holding cage having two ends and guide channels receiving the rods, the guide channels defining an outlet cross section at one end near the bottom with outlet openings disposed according to the given dense packing, and the guide channels defining an inlet cross section at the other end at which the rods are inserted with inlet openings disposed according to the position of the rods in the rod bundle, the insert including a plate having the inlet openings formed therein defining the inlet cross section, the plate being movable toward the outlet cross section against a spring up to a stop; and a pulling tool for pulling the insert out of the holding cage and off the rods in the guide channels, the pulling tool including a hold-down body in the form of a cover washer covering the inlet openings, the cover washer being in a stationary position relative to the holding cage at the inlet cross section for holding the rods disposed in the guide channels.

6 Claims, 5 Drawing Figures

APPARATUS FOR INSERTING RODS CONTAINING NUCLEAR FUEL OR NEUTRON ABSORBER MATERIAL IN A PREDETERMINED DENSE PACKING IN A VESSEL

The invention relates to an apparatus for inserting rods of a rod bundle containing nuclear fuel or neutron absorber material from a nuclear reactor fuel assembly into a vessel with mutually parallel longitudinal axes and a specified dense packing, by placing the vessel on a bottom part associated therewith, including a dense-setting device with a holding cage for receiving the bottom part and for laterally holding together the dense packing of the rods standing with one end on the bottom part, an insert associated with the holding cage having a guide channel for each rod of the rod bundle which forms an outlet cross section at one end toward the receiving point for the bottom part and outlet openings of the guide channels disposed according to the specified dense packing of the rods, and which forms an inlet cross section at the other end for inserting the rods of the rod bundle with inlet openings of the guide channels disposed according to the position of the rods in the rod bundle, and a pulling tool for pulling the insert out of the holding cage and off the rods in the guide channels, the pulling tool having a hold-down body which can be positioned in a stationary manner relative to the holding cage at the inlet cross section of the insert for holding the rods disposed in the guide channels.

Such an apparatus is described in European Patent Application No. 01 28 236. The insert of this apparatus includes guide tubes for the rods containing nuclear fuel or neutron absorber material while the hold-down body which is positioned in a stationary manner relative to the holding cage of the dense-setting device is formed by a multiplicity of hold-down fingers. Each of the fingers engages an inlet opening of another guide tube at the inlet cross section of the insert when the insert is pulled out of the holding cage of the dense-setting device and thus pushes the rod located in the respective guide tube from its guide tube and retains it in the holding cage. Such hold-down fingers require time-consuming adjustment and encounter frictional resistance.

It is accordingly an object of the invention to provide an apparatus for inserting rods containing nuclear fuel or neutron absorber material in a predetermined dense packing in a vessel, which overcomes the heretofore-mentioned disadvantages of the heretofore-known devices of this general type, to avoid the multiplicity of hold-down fingers and to facilitate the dense-setting of the rods.

With the foregoing and other objects in view there is provided, in accordance with the invention, an apparatus for inserting rods of a rod bundle containing nuclear fuel or neutron absorber material from a nuclear reactor fuel assembly into a vessel, comprising a dense-setting device including: a holding cage for laterally holding the rods together in a given dense packing with mutually parallel longitudinal axes, the cage having a bottom on which one end of each of the rods stand; an insert associated with the holding cage having one end relatively closer to the bottom, another end relatively further from the bottom, and guide channels each receiving a respective rod therein, the guide channels defining an outlet cross section at the one end with outlet openings disposed according to the given dense packing, and the guide channels defining an inlet cross section at the other end at which the rods are inserted with inlet openings disposed according to the position of the rods in the rod bundle, the insert including a plate having the inlet openings formed therein defining the inlet cross section along with the plate, and the insert including a restoring spring and a stop, the plate being movable toward the outlet cross section against the spring up to the stop; and a pulling tool for pulling the insert out of the holding cage and off the rods in the guide channels, the pulling tool including a holddown body in the form of a cover washer covering the inlet openings, and the pulling tool including means for positioning the cover washer in a stationary position relative to the holding cage at the inlet cross section for holding the rods disposed in the guide channels.

Contrary to hold-down fingers, the hold-down body in the form of a cover washer of the apparatus according to the invention, requires practically no adjustment effort. Furthermore, when pulling the insert out of the holding cage of the dense-setting device, it generates no frictional resistance in the guide channels of the insert, which occurs with hold-down fingers. When the insert is pulled out of the holding cage of the dense-setting device which forms the inlet cross section of the insert with the inlet openings for the rod, the hold-down body in the form of a cover washer furthermore pushes the plate in the direction toward the outlet cross section of the insert, stressing the resetting springs in the direction toward the output cross section of the insert and at the same time covers the inlet openings in the plate, so that the rods located in the insert cannot emerge from these inlet openings. Therefore, one end of these rods emerges at the outlet cross section of the insert in a nearly dense disposition (such as a triangular grid), can be compressed at that location in the holding cage of the dense-setting device into the predetermined dense packing (such as hexagonally dense) and can be held together in this predetermined dense packing.

If the plate of the insert forming the inlet cross section has finally been moved to its stop, the rods located in the insert are already densely disposed at the ends thereof leaving at the outlet cross section of the insert to such an extent, and are held in the holding cage in such a way, that they no longer travel along with the insert if it is pulled out of the holding cage of the dense-setting device, taking along the hold-down body formed by the cover washer. If the insert is finally pulled completely out of the holding cage of the dense-setting device, then the rods left behind by the holding cage of the dense-setting device are in the predetermined dense packing at their other end as well.

In accordance with another feature of the invention, the insert includes another plate having the outlet openings formed therein defining the outlet cross section along with the other plate, the other plate being rigidly fastened in the insert.

In accordance with a further feature of the invention, there is provided a further plate disposed between the first-mentioned and other plates, the further plate having passage openings formed therein defining another cross section of the guide channels for the rods.

In accordance with an added feature of the invention, the further plate is disposed closer to the other end than the one end of the insert, the further plate being movable together with the first-mentioned plate toward the outlet cross section against the restoring spring.

In accordance with an additional feature of the invention, the further plate is disposed closer to the one end than the other end of the insert and is rigidly fastened in the insert.

In accordance with a concomitant feature of the invention, the guide channels are substantially straight and are directed toward the outlet openings and toward a common target location spaced from the outlet cross section, at the outside thereof and opposite the center thereof.

The device constructed in accordance with the invention in particular provides a low friction resistance between the rods containing the nuclear fuel or neutron absorber material and the guide channels in the insert.

Other features which are considered as characteristic for the invention are set forth in the appended claims.

Although the invention is illustrated and described herein as embodied in an apparatus for inserting rods containing nuclear fuel or neutron absorber material in a predetermined dense packing in a vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 2:
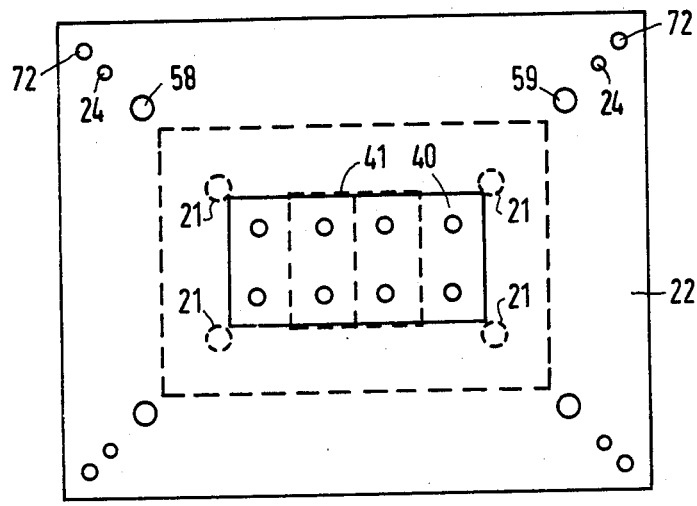
FIG. 2 is a top-plan view of the dense-setting device according to FIG. 1.
Figures 1, 3:
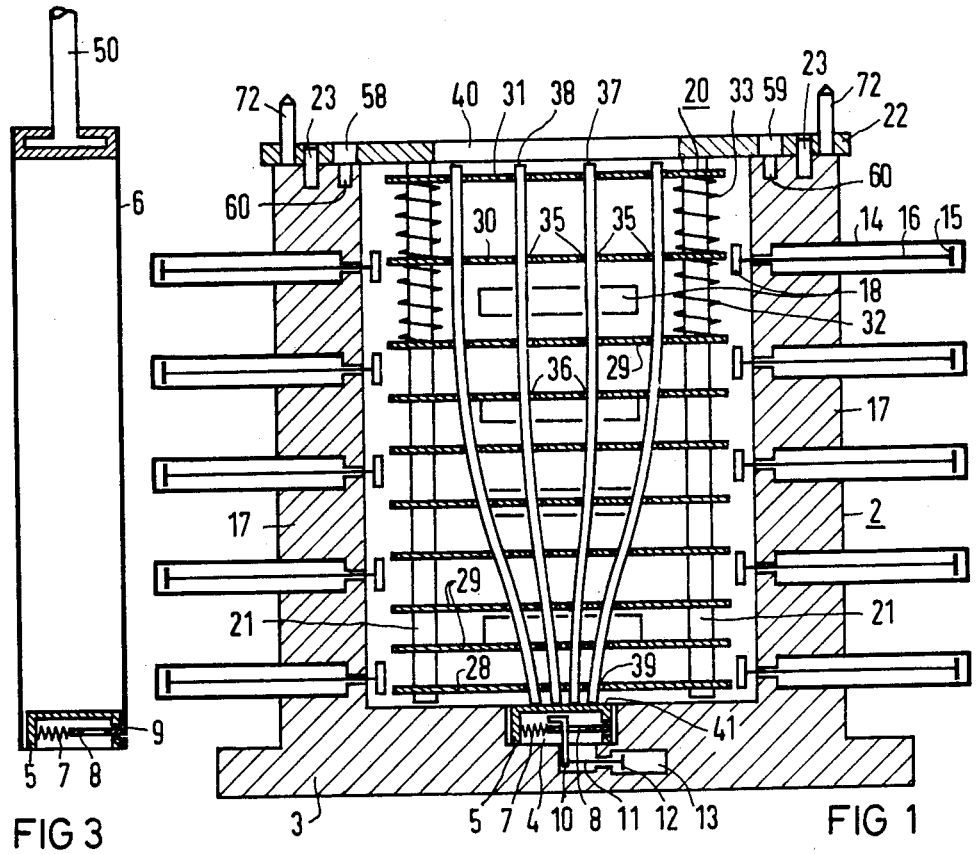
FIG. 1 is a highly diagrammatic, cross-sectional view of the dense-setting device of an apparatus according to the invention with an insert which is inserted and filled with rods.
FIG. 3 is a cross-sectional view of a vessel for receiving rods densely set in the dense-setting device according to FIGS. 1 and 2.
Figure 4:
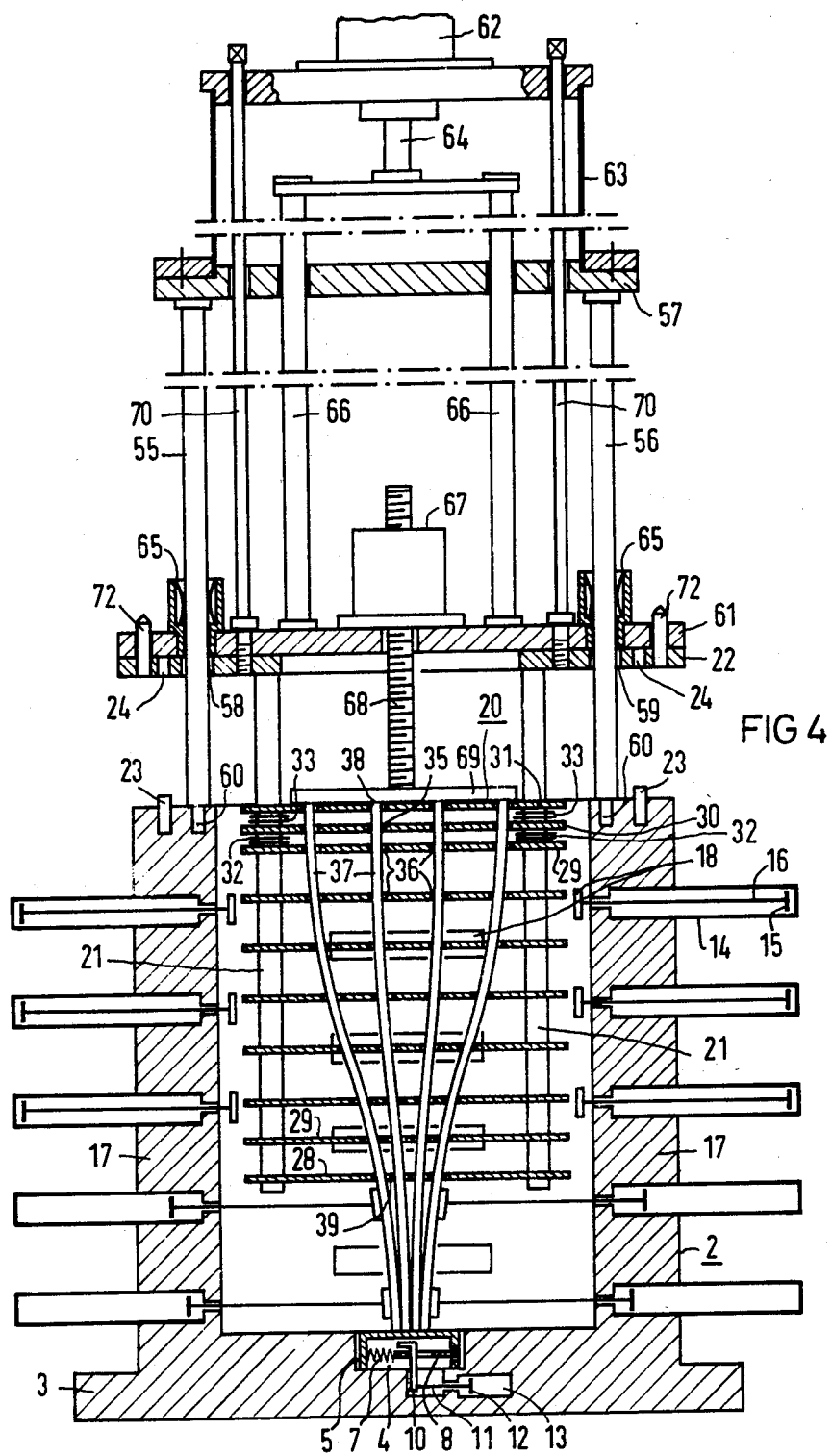
FIG. 4 is a cross-sectional view of the dense-setting device according to FIGS. 1 and 2 including a pulling tool for the insert.

Referring now to the figures of the drawings in detail and first, particularly, to FIGS. 1, 2 and 4 thereof, there is seen a dense-setting device disposed in a non-illustrated basin filled with water. The dense-setting device includes a holding cage 2 which is substantially shaped like a hollow prism that is closed off at the lower end thereof by a bottom 3 and is fastened to the bottom of the basin with the longitudinal axis thereof in a vertical position. The holding cage 2 is open at the top.

The inside of the bottom 3 of the holding cage 2 of the dense-setting device has a recess 4 formed in the center thereof for receiving a bottom part 5 of a vessel 6 with a square cross section, shown in FIG. 3. The bottom part 5 is disposed in the recess 4 with its inside toward the outside. The outside of the bottom part 5 has a detent device 8 provided with a resetting spring 7, which can snap into a detent opening 9 formed in the outer surface of the vessel 6, under the action of the resetting spring 7.

The recess 4 in the bottom 3 of the holding cage 2 is engaged by a vertical actuating rod 10 for the detent device 8 of the bottom part 5. The actuating rod 10 is mounted at a horizontal piston rod 11 of a piston 12 which is located in a cylinder 13. The cylinder 13 has a longitudinal axis disposed horizontally in the bottom 3 of the holding cage 2 and can be acted upon on both sides of the piston 12 by a hydraulic medium, such as compressed air.

Cylinders 14 with horizontal longitudinal axes are disposed at vertical side walls 17 of the holding cage 2. The cylinders 14 have pistons 15 and horizontal piston rods 16. The cylinders 14 can also be acted upon by a hydraulic medium on both sides of the piston 15. A horizontal pressure strip 18 is disposed at the outer end of each piston rod 16 on the inside of the respective side walls 17 of the holding cage 2. The horizontal pressure strips 18 which are disposed transversely to the longitudinal direction of the piston rod 16, can be moved back and forth with the piston 15 in the longitudinal direction of the piston rod 16. The pressure strips 18 are advantageously located in pairs at two mutually parallel side walls 17 and are alternatingly disposed in different cross sectional planes of the holding cage 2 which are spaced from each other.

Additionally disposed in the holding cage 2 of the dense-setting device is an insert 20 which has a basic framework formed by four mutually parallel corner rods 21 fastened with their upper ends to the lower surface of a rectangular supporting plate 22. The corner rods 21 are disposed vertically in the holding cage 2, while the supporting plate 22 rests with its lower surface flush against the end faces of the top of the side wall 17. The supporting plate 22 is centered on the side wall by vertical centering pins 23 which are worked into the end faces of the side wall 17 and extend through centering feedthroughs 24 in the supporting plate 22.

Plates 28 and 29 which are parallel to the supporting plate 22 and are spaced from each other, are disposed at the lower ends of the corner rods 21, one behind the other as seen in the longitudinal direction of the corner rods 21. The corner rods 21 extend at right angles through the plates which are welded to the corner rods 21, so that they are rigidly fastened to the insert 20. Two plates 30, 31 are disposed at the upper end of the corner rods 21 one behind the other as seen in the longitudinal direction of the corner rods 21, between a plate 29 welded to the corner rods 21 and the supporting plate 22. The corner rods 21 also extend at right angles through the two plates 30 and 31 but the plates can be moved on these corner rods 21 in their longitudinal direction. Return springs are provided between the plate 29 which is rigidly welded to the corner rod 21 and the movable plate 30 which is directly adjacent thereto. The return springs are in the form of coil springs 32, one of which is mounted on each respective one of the corner rods 21. Restoring springs are disposed between the movable plate 30 and the movable plate 31 which is immediately adjacent the supporting plate 22. The restoring springs are in the form of coil springs 33, one of which is mounted on each respective one of the corner rods 21.

The movable plate 30 and the plate 29 which is rigidly welded to the corner rods 21, each of which form a cross section of the insert 20, have passage openings 35 and 36 formed therein. One passage opening 35 and one passage opening 36 of the plates 30 and 29 together form a guide channel for a rod 37 which may contain spent nuclear fuel. An inlet opening 38 for such a guide channel is always formed in the plate 31 which forms the inlet cross section of the insert 20, while an outlet opening 39 in the plate 28 forming the outlet cross section of the insert 20, is formed right at the lower end of the corner rods 21.

As viewed from the movable plate 31 which forms the inlet cross section of the insert 20, it is seen that the inlet opening 38 and the passage openings 35 and 36 of each guide channel are aligned over a height which is approximately equal to one third of the total height of the insert 20 determined by the length of the corner rod 21. Adjacent thereto, the passage openings 36 in the plates 29 welded to the corner rods 21 define a bent guide channel for the respective rod 37, extending over a height approximately equal to one half of the total height of the insert 20. Finally, the passage openings 36 in the plates 29 rigidly welded to the corner rods 21 and the outlet opening 39 in the plate 28 which is also welded to the corner rods 21 and forms the outlet cross section of the insert 20, determine straight guide channels for the rods 37 over a height equal to about one sixth of the total height of the insert 20. These straight guide channels are aimed at a common target which is on the outside of the plate 28, opposite the center thereof, and located at a distance from the plate 28 forming the outlet cross section. All of the outlet openings 39 in the plate 28 forming the outlet cross section of the insert 20 are located opposite the bottom part 5, in the recess 4 in the bottom 3 of the holding cage 2.

A rectangular window 40 is formed in the supporting plate 22 of the insert 20 between the four corner rods 21, which forms framing for the inlet cross section of the insert 20. The framing of the outlet cross section of the insert 20 is determined by framing 41 of the bottom part 5 of the vessel 6.

As mentioned above, the pressure strips 18 of the dense-setting device are inserted into the empty holding cage 2, in such a way that they are located directly at the inside of the side walls 17. However, an empty vessel 6 which is suspended from lifting and transporting equipment 50 is first inserted into the holding cage 2 with its bottom part 5 placed into the recess at the bottom 3 of the holding cage 2. In that position, the actuating rod 10 extends through the detent device 8 on the outside of the bottom part 5 and releases the detenting or locking of the bottom part 5 with the vessel 6 by appropriate actuation of the piston 12. The vessel 6 is then pulled out from the holding cage 2 again and transported to one side, while its bottom part 5 remains in the recess 4 and is held there by the actuating rod 10 extending behind the detent device 8. With the aid of a pulling tool shown in FIG. 4, the insert 20 is inserted into the holding cage 2 of the dense-setting device in such a manner that the supporting plate 22 rests against the end faces of the side walls 17 at the top on the holding cage 2 in a flush manner and is centered by the centering pins 23. The pulling tool is then detached from the insert 20, lifted and moved to one side.

Subsequently, the plate 31 representing the inlet cross section of the insert 20, can be locked at the corner rods 21 of the insert 20 by means of a non-illustrated locking device, with the return springs 32 and 33 released.

Figure 5:
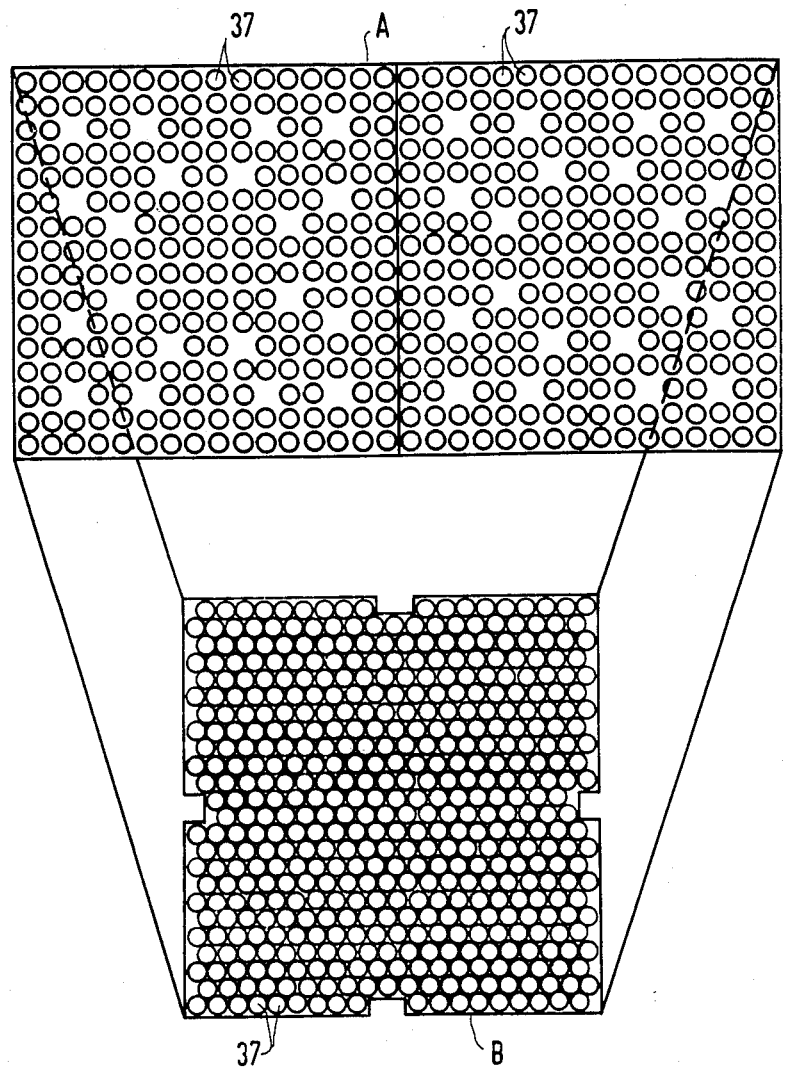
FIG. 5 is a perspective view illustrating the dense-setting of rods by means of the dense-setting device according to FIGS. 1, 2 and 4.

Two bundles of rods which may contain spent nuclear fuel are then placed through the window 40 of the supporting plate 22 onto the plate 31, i.e. at right angles to the plate 31, with the longitudinal axes of the rods in a vertical position. These two bundles come from two spent nuclear fuel assemblies, the head and base parts of which have been removed The rods of the two rod bundles are held in their position with respect to each other by grid-shaped spacers In FIG. 5, the cross section A of the two rod bundles with the individual rods 37 is indicated in the window 40. The inlet openings 38 in the plate 31, belonging to the guide channels in the insert 20 for the rods 37, have a position corresponding to the position of the rods 37 in the cross section A in FIG. 5.

A non-illustrated push-out tool is then used to subsequently push out the rods 37 together from the grid shaped spacers and into the guide channels of the insert 20 which are formed by the inlet openings 38 in the plate 31, the passage openings 36 in the plates 29 and the outlet openings 39 in the plate 28. Since the length of the rods 37 which are formed by cladding tubes of a zirconium alloy and therefore the total height of the insert 20 is about 4 meters, while its diameter is only about 10 millimeters and the wall thickness of the cladding tubes is less than 1 millimeter, the rods can also follow the curved guide channels which are formed by the passage openings 36 in the plates 29 if the number of plates 29 of the insert 20 is just large enough and their mutual spacing is just small enough.

After the rods 37 have been pushed completely into the guide channels of the insert 20, the non-illustrated pushing-out tool is run to one side and the pulling tool is again fastened at the insert 20 in the holding cage 2 according to FIG. 4. The pulling tool has two vertical guide rods 55 and 56 which are fastened with their upper ends to the lower surface of a common support body 57. The guide rods 55 and 56 are conducted through feedthroughs 58 and 59 in the supporting plate 22 of the insert 20, so that their lower ends engage adjustment recesses 60 in the end faces of the side walls 17 at the top of the holding cage 2.

Two tie rods 66 which are parallel to the guide rods 55 and 56 and have lower ends which are screwed on the upper surface of a holding plate 61, are brought through the support body 57. The upper ends of the tie rods 66 are brought through the support body 57 and are fastened to the lifting piston of a lifting cylinder 62 which in turn is attached to the upper end of a hollow cylindrical body 63. The support body 57 is fastened to the lower end of the body 63 in which the piston rod 64 of the lifting cylinder 62 is fastened at the upper ends of the tie rod 66.

The guide rods 55 and 56 extend through the support plate 61. The support plate 61 can be moved in the longitudinal direction of the guide rods 55 and 56 through ball sleeves 65. An electric positioning motor 67 which drives a spindle 68 extended through and below the support plate 61 is mounted at the middle of the upper surface of the plate. A horizontal cover washer 69 is disposed below the support plate 61 at the lower end of the spindle 68. The horizontal cover washer 69 is held in such a manner that it does not turn along with the spindle 68 which is parallel to the guide rods 55 and 56 and the tie rods 66. This cover washer 69 covers all of the inlet openings 38 of the plate 31 of the insert 20.

After the guide rods 55 and 56 of the pulling tool are put in place through the feedthroughs 58 and 59 in the supporting plate 22 on the end faces of the side walls 17 of the holding cage 2, the lower surface of the holding plate 61 is centered at the upper surface of the supporting plate 22 of the insert 20 by centering bolts 72 and is screwed to the supporting plate 22 by means of screws 70. The locking device through which the plate 31 of the insert 20 was locked at its corner rods 21, is then released.

Subsequently, the lifting piston in the lifting cylinder 62 is actuated and the insert 20 which was bolted to the holding plate 61 is pulled out of the holding cage 2. At the same time, the electric positioning motor 67 is put in operation, which moves the cover washer 69 on the spindle 68 toward the plate 31 of the insert 20 with the same feed velocity with which the insert 20 is pulled out of the holding cage 2, so that the cover washer 69 initially remains stationary relative to the holding cage 2 of the dense-setting device. The cover washer 69 not only holds back the rods 37 in the guide channels of the insert 20, but also moves the plates 31 and 30 against the resetting springs 32 and 33 and toward the plates 29 of the insert 20 which are rigidly welded to the corner rods 21, until the restoring springs 32 and 33 are compressed to a stop and a non-illustrated electric end switch switches off the electric positioning motor 67. Up to that point the rods 37 have already emerged by about one third of their length from the plate 28 forming the outlet cross section and are compressed by successive removal of the pressure strips 18, so that the lower ends of the rods stand at their predetermined dense packing at right angles to the inside of the bottom part 5 in the recess 4 in the bottom 3 of the holding cage 2 and concurrent travel of rods 37 upon further pulling out of the insert 20 from the holding cage 2 is precluded. Compressing the rods 37 by means of the pressure strips 18 is facilitated by the fact that the rods 37 emerging from the plate 28 through the outlet openings 39 have the tendency to run together by themselves into the predetermined dense packing.

Upon successive further removal of the pressure strips 18 from the bottom into the holding cage 2 during the removal of the insert 20 from the holding cage 2, the rods 37 are still held in the predetermined dense packing on the bottom part 5 but only by the pressure strips 18, after the insert 20 is completely pulled out of the holding cage 2. The cross section of the rods 37 standing on this bottom part 5 can correspond, for instance, to the hexagonally densest packing according to the cross section B in FIG. 5.

The pulling tool with the insert 20 is then lifted out of the holding cage 2 and is moved to one side. Subsequently, the vessel 6 which is suspended from the lifting and transporting equipment 50 and which is open at the bottom is pushed from the top down over the rods 37 held in a predetermined dense packing in the holding cage 2, wherein the pressure strips 18 are reinserted successively, from the top down. Finally, the vessel 6 is slipped over the bottom part in the recess 4 and the detent device 8 is released by the actuating rod 10, so that the bottom part 5 is again locked to the vessel 6. The vessel 6 which is filled with the rods 37 in the specified dense packing can finally be lifted out of the holding cage 2 by the lifting device 50 and can be kept in readiness in the basin for further disposition.

The foregoing is a description corresponding in substance to German Application No. P 35 06 584.2, filed Feb. 25, 1985, the International priority of which is being claimed for the instant application, and which is hereby made part of this application. Any material discrepancies between the foregoing specification and the aforementioned corresponding German application are to be resolved in favor of the latter.

We claim:

1. Apparatus for consolidating and for handling rods of a rod bundle from a nuclear reactor fuel assembly, comprising:

a vessel, a bottom associated with said vessel; and a device for increasing the density of rods including a holding cage for laterally holding the rods together in a given dense packing with mutually parallel longitudinal axes, said cage receiving said bottom with one end of each of the rods standing on said bottom;

an insert associated with said holding cage, said insert having one end relatively closer to said bottom, another end relatively further from said bottom, and guide channels each receiving a respective rod therein, said guide channels defining an outlet cross section at said one end in which said bottom is disposed and at which the rods exit said holding cage with outlet openings disposed according to said given dense packing, and said guide channels defining an inlet cross section at said other end at which the rods are inserted into said holding cage with inlet openings disposed according to the position of the rods in the rod bundle, said insert including a plate having said inlet openings formed therein defining said inlet cross section along with said plate, and said insert including a restoring spring and a stop, said plate being movable toward said outlet cross section against said spring up to said stop; and a pulling tool for pulling said insert out of said holding cage and off the rods in the guide channels, said pulling tool including a hold-down body in the form of a cover washer covering said inlet openings, and said pulling tool including means for positioning said cover washer in a stationary position relative to said holding cage at said inlet cross section for holding the rods disposed in said guide channels.

2. Apparatus according to claim 1, wherein said insert includes another plate having said outlet openings formed therein defining said outlet cross section along with said other plate, said other plate being rigidly fastened in said insert.

3. Apparatus according to claim 2, including a further plate disposed between said first-mentioned and other plates, said further plate having passage openings formed therein defining another cross section of said guide channels for the rods.

4. Apparatus according to claim 3, wherein said further plate is disposed closer to said other end than said one end of said insert, said further plate being movable together with said first-mentioned plate toward said outlet cross section against said restoring spring.

5. Apparatus according to claim 3, wherein said further plate is disposed closer to said one end than said other end of said insert and is rigidly fastened in said insert.

6. Apparatus according to claim 1, wherein said guide channels are substantially straight and are directed toward said outlet openings and toward a common target location spaced from said outlet cross section, at the outside thereof and opposite the center thereof.

* * * * *